No. 807,069. PATENTED DEC. 12, 1905.
A. R. GEOFFROY.
AUTOMATIC FASTENING DEVICE.
APPLICATION FILED AUG. 11, 1905.
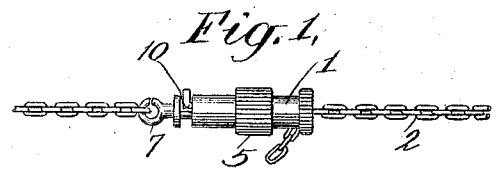
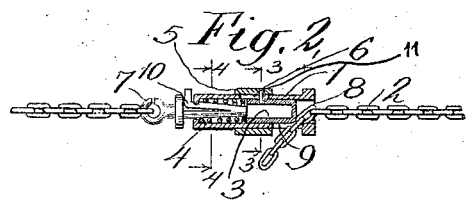
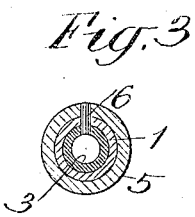 
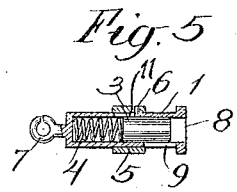
WITNESSES:
K. P. McElroy
E. M. Marble
INVENTOR
Arthur R. Geoffroy
BY
H. M. Marble
ATTORNEY

UNITED STATES PATENT OFFICE.

ARTHUR R. GEOFFROY, OF NEWARK, NEW JERSEY.

AUTOMATIC FASTENING DEVICE.

No. 807,069.     Specification of Letters Patent.     Patented Dec. 12, 1905.

Application filed August 11, 1905. Serial No. 273,792.

*To all whom it may concern:*

Be it known that I, ARTHUR R. GEOFFROY, a citizen of the United States, residing at Newark, in the county of Essex and State of New Jersey, have invented certain new and useful Improvements in Automatic Fastening Devices, of which the following is a specification.

My invention relates to improvements in automatic fastening devices, and is particularly intended for use in necklaces, bracelets, and similar articles of jewelry.

My invention consists in novel means for gripping automatically a chain or the like and in other features of invention, as hereinafter described, and particularly pointed out in the claims.

The objects of my invention are to improve the construction of automatic fastening devices, and particularly fastening devices such as are adapted to grip a chain or the like at various points along its length; to adapt such fastening device for use in necklaces, bracelets, &c., in connection with a chain or the like; to make the improved fastening device simple, compact, neat in appearance, and automatic in action; to make the improved fastening device easy to operate, and to combine the fastening device in a neat and compact manner with a snap-fastening such as is commonly used in necklaces and the like.

I will now proceed to describe my invention with reference to the accompanying drawings, illustrating one embodiment of my invention, and will then point out the novel features in claims.

In the said drawings, Figure 1 shows a side view of one form of my device, the particular device shown having in combination with it a snap cast-off fastening of well-known construction. Fig. 2 shows a longitudinal section of the device shown in Fig. 1. Figs. 3 and 4 show transverse sections taken on lines 3 3 and 4 4, respectively, of Fig. 2. Fig. 5 shows a side view of the device with the cast-off clasp omitted.

My improved fastening device consists, essentially, of a guide for the chain or the like to be gripped and a spring-pressed clamping member adapted to press against the chain, so as to prevent the same from moving. In the construction shown in the drawings the guide member is also a guide for said clamping member, and consists of a tubular member 1, having an opening at one end and another opening in its side for the passage of the chain 2. The clamping member consists of a bolt 3, arranged to slide within the tubular member 1 and having preferably a rounded end, so that it will cause no injury to the chain when it grips the latter. This bolt is pressed forward normally by a spring 4 in the rear portion of the tube 1. A collar 5 surrounds the tube 1 and is arranged to slide thereon, and said collar is connected by suitable means, such as the pin 6, with the bolt 3 and forms the means for drawing back said bolt, so as to free the chain. The pin 6 works within a suitable slot 11 in the tube 1.

When my improved fastening device is employed in necklaces, chain or metallic cord bracelets, and the like, one end of the chain or cord will customarily be secured to the rear end of the tube 1, which tube will be provided with an eye or ring 7 for the purpose. Said chain will pass through the end opening 8 of the tube and thence through the side opening 9 thereof, the free end of the chain hanging loosely or being caught up in any desired manner. Normally the bolt 3 will press against the chain, preventing it from moving through the tube; but when it is desired to adjust the chain said bolt may be drawn back by means of the collar 5 and the chain may then be drawn freely through the adjusting device, the collar being released and the bolt 3 allowed to spring forward and grip the chain as soon as the desired adjustment is obtained.

My improved fastening device may be used with or without a cast-off clasp, as preferred. Figs. 1, 2, and 4 show it provided with a cast-off clasp of well-known construction, and Fig. 5 shows it without such cast-off clasp. For many purposes no cast-off clasp is necessary or desirable, as the fastening device permits such easy and rapid adjustment of the chain that a device permitting ready detaching of one end of the chain from the fastening device would be superfluous; but when a cast-off clasp or detaching device is desired it may be combined with my fastening device, and by making the bolt 3 hollow this may be done with very little increase in the length of the device, as will be seen by comparing Figs. 1 and 2 of the drawings, showing the device provided with a cast-off clasp, with Fig. 5 showing the device without such cast-off clasp.

In the construction shown in Figs. 1 and 2 the snap 10, constituting the cast-off or detaching clasp, projects into the bolt 3 without engaging the same, however, said snap engaging the tube 1 in the ordinary well-known manner. Because the bolt 3 is hollow and permits the snap 10 to project into it said snap adds very little to the length of the device.

What I claim is—

1. In a fastening device for necklaces and the like, the combination with a tubular member provided at one end with means for connecting it to a chain or other device, and provided near its other end with a passage for a chain or other flexible device to be held, of a spring-actuated gripping member within said tubular member and arranged to press against an object within said passage, said gripping member provided with operating means projecting through a slot in the side of said tubular member.

2. In a fastening device for necklaces and the like, the combination with a tubular member provided at one end with means for connecting it to a chain or other device, and provided near its other end with a passage for a chain or other flexible device to be held, of a spring-actuated gripping member within said tubular member and arranged to press against an object within said passage, an operating-collar mounted on said tubular member, and means connecting said gripping member and collar working through a slot in said tubular member.

3. In an automatic fastening device, the combination with a tubular member comprising a passage for a chain or other flexible device to be held, and a spring-actuated hollow gripping member arranged to press normally against a chain or the like within said tubular member, of a cast-off fastening adapted to engage said tubular member and when in engagement therewith projecting into the bore of said hollow gripping member.

4. In an automatic fastening device, the combination with two coacting members one of which is provided with means for guiding a chain or other flexible article to be held and the other is guided by said first member and is spring-pressed toward a chain or other flexible article so held, said second member being hollow, of a cast-off fastening adapted to engage said first member and when in engagement therewith projecting into the bore of said other member.

In testimony whereof I hereunto affix my signature in the presence of two witnesses.

ARTHUR R. GEOFFROY.

Witnesses:
H. M. MARBLE,
D. HOWARD HAYWOOD.